July 2, 1929.  C. J. HOLSLAG  1,719,113

WELDING TOOL

Filed Feb. 29, 1928

INVENTOR
CLAUDE J. HOLSLAG
BY
A. D. T. Libby
ATTORNEY

Patented July 2, 1929.

1,719,113

UNITED STATES PATENT OFFICE.

CLAUDE JOSEPH HOLSLAG, OF SOUTH ORANGE, NEW JERSEY, ASSIGNOR TO ELECTRIC ARC CUTTING & WELDING COMPANY, OF NEWARK, NEW JERSEY.

WELDING TOOL.

Application filed February 29, 1928. Serial No. 257,863.

This invention relates to an implement or tool used in connection with electric arc welding, wherein a metallic electrode forming one side of the arc circuit, is held in the tool.

My present invention relates to an improvement in the welding tool or handle shown and described in Campbell Patent 1,306,746, issued June 17, 1919. In my improved welding handle, I secure all of the advantages set forth in the said Campbell patent, together with additional improvements which are set forth in the general objects of my invention.

In a welding handle used for metallic arc welding, a great deal of heat is transferred to the handle by the heat of the arc formed at the end of the electrode and if this electrode is melted down into the work, the arc comes closer to the jaw portion of the handle and the handle may become uncomfortably hot. It is therefore the principal object of my invention to provide a welding tool or handle in which cooling or heat-dissipating means are provided, so as to reduce the temperature of the handle on that part of the tool which is held in the hands of the operator.

Another object of my invention is to improve the conductivity of the metallic members constituting the handle, so as to reduce as much as possible, the heat due to the $C^2R$ loss in the handle, although these losses are comparatively small as compared with the heat produced by the arc.

Another object of my invention is to provide means for protecting the end of the electric cable which is attached to the end of the tool. These and other objects will be apparent to one skilled in this art after a study of the specification taken in connection with the annexed drawings, wherein.

Figure 1:
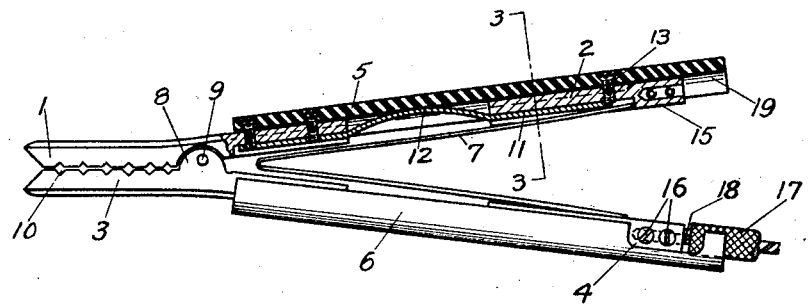
Figure 1 is a view of about half-size of the improved form of welding tool, showing part of one of the members in sections.
Figure 2:
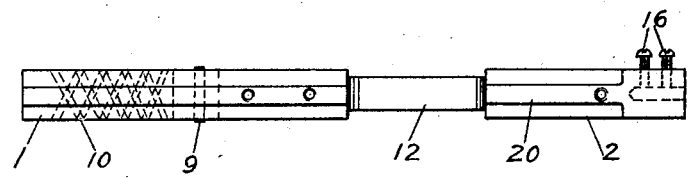
Figure 2 is a plan view of the top member comprising the tool without the insulating strip.
Figure 3:
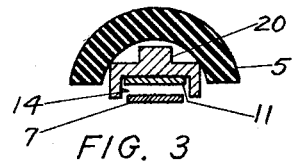
Figure 3 is a section on the line 3—3 of Figure 1.

In the various views, 1 and 2 are metallic members having considerable size and rigidity and a fair electrical conductivity. Briefly, these members are made of manganese bronze, and to assist in giving them rigidity, they are each provided with longitudinal ribs 20. In the Campbell patent previously referred to, 1 and 2 are integral, but in order to get greater ventilation and to interrupt the passage of the heat from the jaw member 1 back to the member 2, I have separated these two pieces a considerable distance, but have then connected them electrically together by means of a strip of metal having high conductivity, such as copper, and the ends 11 of this strip extend for some distance in a channel 14 in the pieces 1 and 2. The ends 11 of the copper strip are preferably welded to the pieces 1 and 2.

In order to allow for expansion due to the passages of current and heat from the arc, I have bored out the center portion of the strip as indicated by 12. The pieces 1 and 2 are joined together by a heavy insulating strip 5 which is fastened to the pieces 1 and 2 in a satisfactory manner as by screws 13, which are shown put in from the outside with their heads below the surface of the insulating strip 5, and the heads are then covered with insulating material. If so desired, the screws may pass through the members 1 and 2 in the opposite direction from that shown.

The other member comprising the handle is made up of pieces 3 and 4 and insulating strip 6, together with its copper strip, as described for the first member. The pieces 1 and 3 comprising parts of the two members of the handle, are pivoted together by the pin 9 passing through ears 8 on the piece 3. The means of pivoting the jaw pieces 1 and 3 together are briefly the same as described in the Campbell patent and the jaw members 1 and 3 are provided with serrations 10 for holding the electrical welding electrodes securely in position.

The extremities 15 of the pieces 2 and 3 have holes therein to receive the ends 18 of an electrical cable 17. Screws 16 are used as one means for fastening the conductor 18 in the hole provided in the ends 15. In order to protect the end of the cable where it is attached to the handle, and to prevent the sharp bends at the point where the conductor 18 enters the hole in either of the pieces 2 and 4, the insulating pieces 5 and 6 are extended beyond the pieces 2 and 4 as indicated in Figure 1. The extension 19 also protects the operator from coming into contact with any bare portions of the metallic members of the handle.

A V-shaped spring 7 is utilized as in the

Campbell patent for pushing the jaw pieces 1 and 3 together, but it will be obvious that another style of spring may be used, preferably functioning against the members 2 and 4 to perform this same function. It is also clear that certain of the details entering into the construction of my improved handle may be varied without departing from the spirit of my invention or the scope of the appended claims.

Having thus described my invention, what I claim is:

1. A welding tool comprising two members pivoted together forming gripping jaws on one side of the pivot and a handle portion on the other side, each of said members including; two relatively large metal pieces electrically connected together by a strip of metal much smaller in cross-sectional area but of much higher unit electrical conductivity than said pieces, and an insulating strip fastened to said pieces to form part of a protecting handle; resilient means positioned between said members for automatically forcing the gripping jaws to grip an electrode placed therebetween, and means for attaching an electrical cable to the outer ends of said metal pieces remote from the pivot.

2. A welding tool comprising two members pivoted together forming gripping jaws on one side of the pivot and a handle portion on the other side, each of said members including; two relatively large metal pieces separated so as to leave a considerable space between them, but electrically connected by a strip of metal much smaller in cross-section but of high electrical conductivity, and a strip of insulating material extending over said gap between said pieces and fastened to the pieces to form part of a protecting handle; resilient means positioned between said members for automatically forcing the gripping jaws to grip an electrode placed therebetween, and means for attaching an electrical cable to the outer ends of said metal pieces remote from the pivot.

3. A welding tool comprising two members pivoted together forming gripping jaws on one side of the pivot and a handle portion on the other side, each of said members including; two relatively large metal pieces separated so as to leave a considerable space between them, but electrically connected by a strip of metal much smaller in cross-section but of high electrical conductivity which strip extends a considerable distance along the inner surface of said pieces, and a strip of insulating material fastened to said pieces and extending from a point near the pivot on one piece over the gap between the pieces and beyond the end of the other pieces to form a protecting end for an electrical cable to be connected thereto; resilient means positioned between said members for automatically forcing the gripping jaws to grip an electrode placed therebetween, and means for attaching an electrical cable to the outer ends of said metal pieces remote from the pivot.

4. A welding tool comprising two members pivoted together forming gripping jaws on one side of the pivot and a handle portion on the other side, each of said members including; two relatively large metal pieces separated a considerable distance and one having the pivotal means thereon and a channel extending from a point near the pivot to the end away from jaw portion, the other piece having a channel extending from the end toward the first piece to a point near the other end, said pieces being electrically connected together by a copper strip having its ends lying in and extending substantially the length of said channels and welded to said pieces and a strip of insulating material fastened to said pieces forming a part of a protecting handle; resilient means positioned between said members for automatically forcing the gripping jaws to grip an electrode placed therebetween, and means for attaching an electrical cable to the outer ends of said metal pieces remote from the pivot.

5. A welding tool comprising two members pivoted together forming gripping jaws on one side of the pivot and a handle portion on the other side, each of said members including; two relatively large metal pieces separated so as to leave a considerable space between them, but electrically connected by a strip of metal much smaller in cross-section but of high electrical conductivity, and a strip of insulating material extending over said gap between said pieces and fastened to the pieces to form part of a protecting handle, said metal strip being bowed outwardly toward the insulating strip for the purposes described; resilient means positioned between said members for automatically forcing the gripping jaws to grip an electrode placed therebetween, and means for attaching an electrical cable to the outer ends of said metal pieces remote from the pivot.

6. A welding tool comprising a pair of relatively heavy and stiff metal pieces pivoted together forming gripping jaws on one side of the pivot, said pieces terminating a certain distance beyond the pivot, a pair of pieces spaced from the first mentioned pair, an insulating strip fastened to a piece of each of said pairs thereby forming a protecting handle for the tool, copper strips fastened to and electrically connecting the pieces joined by said insulating strips, resilient means acting between the pieces remote from the pivot for moving the pivot pieces to grip an electrode placed between the jaws, means for attaching an electrical cable to the ends of the outer pieces and means for protecting the cable adjacent the point where it is attached to its respective piece.

7. In a device of the class described the combination of two members pivoted together forming gripping jaws on one side of the pivot and a handle portion on the other side with resilient means acting between said members to force the jaws to grip an electrode, means for increasing the current carrying capacity from the cable end of the tool to the electrode jaw end and means for dissipating the heat produced at the jaw end of the tool due to the heat from the arc at the electrode, said means consisting in separating for a considerable distance the relatively large and somewhat low conductivity metal pieces constituting parts of each of said members, thereby leaving an air space between said pieces and connecting said pieces by a copper strip which extends in contact with said pieces for a considerable distance, as and for the purposes described.

In testimony whereof, I affix my signature.

CLAUDE JOSEPH HOLSLAG.